(12) United States Patent
Udono

(10) Patent No.: US 8,082,811 B2
(45) Date of Patent: Dec. 27, 2011

(54) LOCOMOTIVE PERFORMANCE TESTING APPARATUS

(75) Inventor: Kenro Udono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 510 days.

(21) Appl. No.: 12/376,193

(22) PCT Filed: Oct. 2, 2007

(86) PCT No.: PCT/JP2007/069256
§ 371 (c)(1),
(2), (4) Date: Feb. 3, 2009

(87) PCT Pub. No.: WO2008/053659
PCT Pub. Date: May 8, 2008

(65) Prior Publication Data
US 2010/0000345 A1    Jan. 7, 2010

(30) Foreign Application Priority Data
Nov. 1, 2006  (JP) ................................. 2006-297723

(51) Int. Cl.
*G01N 19/00*   (2006.01)
(52) U.S. Cl. ....................................... 73/865.9
(58) Field of Classification Search .................. None
See application file for complete search history.

(56) References Cited

U.S. PATENT DOCUMENTS

| | | | |
|---|---|---|---|
| 4,708,337 | A | 11/1987 | Shyu |
| 5,800,314 | A | 9/1998 | Sakakibara |
| 6,135,924 | A | 10/2000 | Gibbs |
| 6,666,831 | B1 | 12/2003 | Edgerton |

FOREIGN PATENT DOCUMENTS

| | | |
|---|---|---|
| JP | 07-136295 | 5/1995 |
| JP | 10-071216 | 3/1998 |
| JP | 10-155934 | 6/1998 |

OTHER PUBLICATIONS

"Development and Evaluation of Split Belt Treadmill for a Small Bipedal Robot", Kazuki Koide, Taishin Nomura, Shunsuke Sato, IEICE Technical Report, Mar. 11, 2004, vol. 103, No. 731, pp. 11 to 16, (English abstract included).

*Primary Examiner* — Robert Raevis
(74) *Attorney, Agent, or Firm* — Rankin, Hill & Clark LLP

(57) ABSTRACT

Provided is a testing apparatus capable of testing locomotive performance of a robot while harmonizing motions of the apparatus with that of the robot. According to the locomotive performance testing apparatus (1), a motor working plan is made on the basis of a robot motion plan, and a motor (12) is driven according to the motor working plan. As a result, an alteration pattern of a driving velocity of an endless belt (11) can be controlled according to an alteration pattern of a moving velocity of a robot (2) whose locomotive performance is being tested on the endless belt (11). Moreover, a motion tempo of the endless belt (11) and a motion tempo of the robot (2) are so harmonized that the former tempo may approach the latter tempo, and the locomotive performance of the robot (2) can be stably tested in that state.

14 Claims, 5 Drawing Sheets

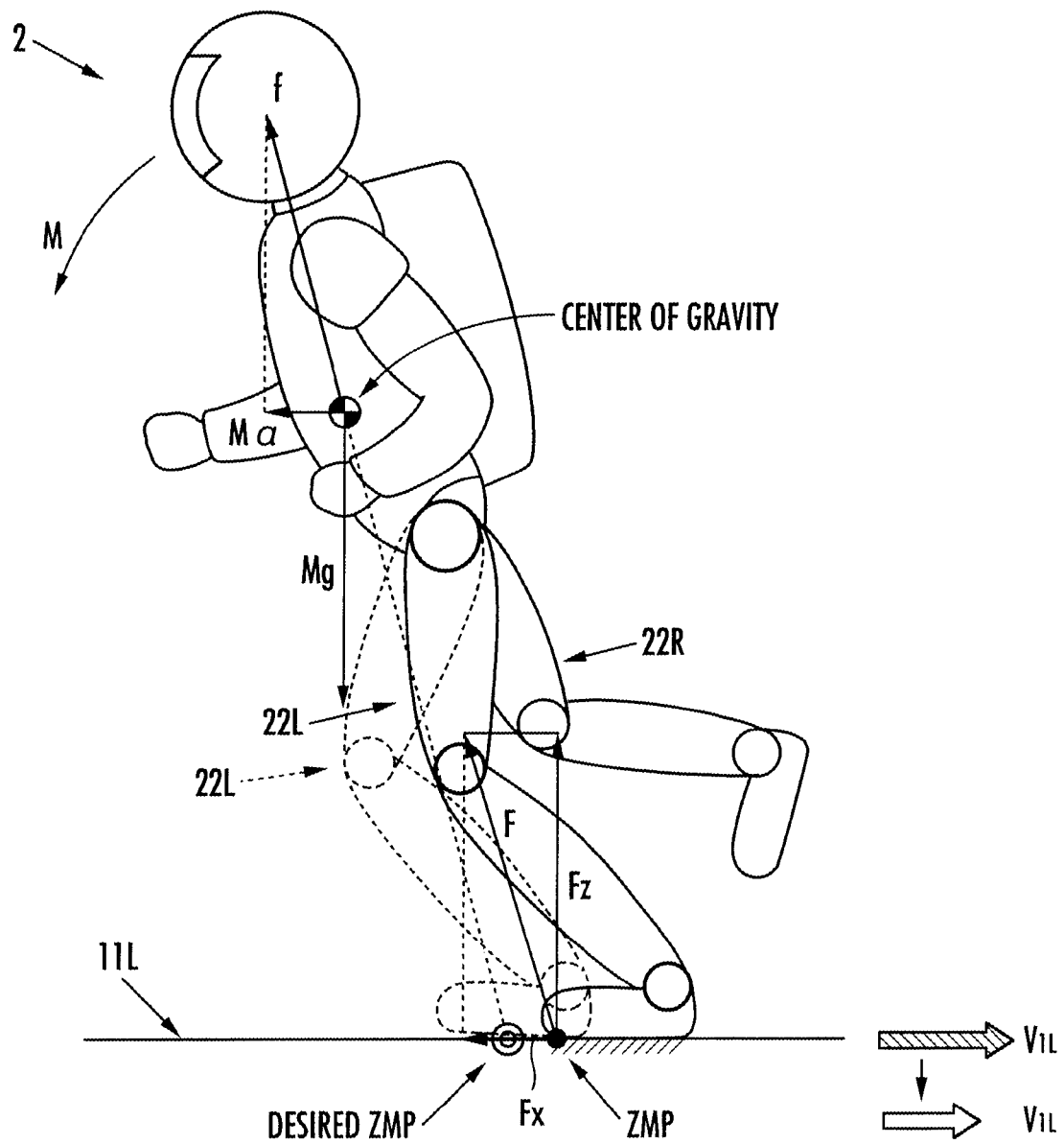

LOCOMOTIVE PERFORMANCE TESTING APPARATUS

PRIORITY CLAIM

The present application is based on and claims the priority benefit of Japanese Patent Application 2006-297723 filed on Nov. 1, 2006, the contents of which are incorporated herein by reference in its entirety.

BACKGROUND OF THE INVENTION

1. Field of the Invention

The present invention relates to a locomotive performance testing apparatus configured to test locomotive performance of a robot capable of moving according to motions of a plurality of legs.

2. Description of the Related Art

There has been disclosed a treadmill configured to adjust a driving velocity of an endless belt driven by a motor according to an anteroposterior position of a runner trained on the endless belt for walking or running (for example, refer to paragraphs 0010 to 0014 and FIG. 3 in Japanese Patent Laid-open No. H07-136295, and paragraphs 0005 to 0007 and FIG. 1 in Japanese Patent Laid-open No. H10-071216).

However, when locomotive performance of a legged robot is tested by using a treadmill, a satisfactory test may not be performed if a motion rhythm or tempo of the treadmill is not in harmony with that of the robot.

SUMMARY OF THE INVENTION

The present invention has been accomplished in view of the aforementioned problems, and it is therefore an object of the present invention to provide a locomotive performance testing apparatus capable of testing the locomotive performance of a robot by harmonizing motions of the testing apparatus with that of the robot.

According to a first aspect of the present invention, there is provided a locomotive performance testing apparatus for testing locomotive performance of a robot capable of moving according to repeated motions of a plurality of legs by leaving a floor and landing on the floor, comprising: an endless belt; a motor to drive the endless belt to rotate; and a motor controlling element configured to control the motions of the motor on the basis of a motor working plan for determining an alteration pattern of a driving velocity of the endless belt, wherein the motor controlling element includes a first processing element configured to recognize a robot motion plan for determining at least an alteration pattern of a moving velocity of the robot through communication with a robot controlling element configured to control the motions of the robot on the basis of the robot motion plan; and a second processing element configured to make the motor working plan on the basis of the robot motion plan recognized by the first processing element.

According to the locomotive performance testing apparatus of the first aspect of the present invention, the motor working plan is made according to the robot motion plan and the motor is driven to work according to the motor working plan. Therefore, the alteration pattern of the driving velocity of the endless belt may be controlled according to the alteration pattern of the moving velocity of the robot whose locomotive performance is being tested on the endless belt. As a result, the motion tempo of the endless belt and the motion tempo of the robot can be harmonized so as to make the motion tempo of the endless belt come to a compromise with the motion tempo of the robot, allowing the locomotive performance of the robot to be performed stably. The term "velocity" in the present application refers to a concept having a direction (vector) and magnitude (scalar), and "velocity alteration" refers to alterations on either one or both of the direction and magnitude of a velocity. Further, "moving velocity of a robot" does not mean a moving velocity in a static coordinate system but in a dynamic coordinate system on an endless belt which is being driven to rotate. Furthermore, "a robot motion plan" includes moving at a given velocity, continuously or stepwise accelerated moving, continuously or stepwise decelerated moving, random walking and the like of a robot.

A second aspect of the present invention is dependent on the first aspect of the present invention, wherein the second processing element makes the motor working plan for determining the driving velocity of the endless belt on the basis of a desired ZMP and a stable support area determined according to the robot motion plan, allowing the desired ZMP to fall into the stable support area.

According to the locomotive performance testing apparatus of the second aspect of the present invention, the driving velocity of the endless belt is controlled so as to enclose the desired ZMP in the stable support area (an enclosed area contacted by a foot portion of the leg of the robot is planar and has no recessed portion in shape). Thereby, the locomotive performance of the robot can be performed by avoiding such situation that the posture of the robot becomes unstable because of the deviation of the desired ZMP from the stable support area due to the motion alteration or the like of the robot.

A third aspect of the present invention is dependent on the first aspect of the present invention, wherein the second processing element makes the motor working plan for determining the alteration pattern of the driving velocity of the endless belt which has a phase difference relative to the alteration pattern of the moving velocity of the robot determined according to the robot motion plan.

According to the locomotive performance testing apparatus of the third aspect of the present invention, the alteration pattern of the driving velocity of the endless belt is controlled to have a phase difference relative to the alteration pattern of the moving velocity of the robot whose locomotive performance is tested on the endless belt. Here, the term "phase difference" refers to a factor for determining a temporal deviation between the driving velocity alteration of the endless belt and the moving velocity alteration of the robot. For example, according to the signs of the phase difference, it may be determined whether the driving velocity of the endless belt is changing faster or slower than the moving velocity of the robot. Moreover, according to the magnitude of the phase difference, it may be determined how much the deviation would be between the driving velocity of the endless belt and the moving velocity of the robot. Thereby, the motion tempos of the endless belt and the robot can be maintained in harmony in relation to the phase difference.

A fourth aspect of the present invention is dependent on the third aspect of the present invention, wherein the second processing element sets the phase difference on the basis of a kinetic state of the robot or the robot motion plan recognized by the first processing element.

According to the locomotive performance testing apparatus of the fourth aspect of the present invention, the locomotive performance of the robot can be performed in such a situation that the motion tempo of the robot is appropriately adjusted by considering the kinetic state or the motion plan of the robot. As an example of the kinetic state of the robot, walking (a repeated action in which partial legs are leaving the floor while the other legs are stepping on the floor), running (all legs are temporarily leaving the floor), motions of a robot at a given velocity, continuous or stepwise accelerated motions, continuous or stepwise decelerated motions, motions on a planar floor, ascending motions on an inclined floor, descending motions on an inclined floor, random walking of a robot and the like may be mentioned.

A fifth aspect of the present invention is dependent on the first aspect of the present invention, wherein the second processing element is configured to cause the robot controlling element to recognize the motor working plan and to make the robot motion plan on the basis of the motor working plan so as to enclose the desired ZMP of the robot in the stable support area through communication with the robot controlling element.

According to the locomotive performance testing apparatus of the fifth aspect of the present invention, the robot may be configured to control the walking motions or running motions thereof so as to enclose the desired ZMP of the robot in the stable support area. Thereby, the locomotive performance of the robot can be performed by avoiding such situation that the posture of the robot becomes unstable because of the deviation of the desired ZMP from the stable support area due to the driving velocity alteration or the like of the endless belt.

A sixth aspect of the present invention is dependent on the fifth aspect of the present invention, wherein the second processing element is configured to cause the robot controlling element to recognize the alteration pattern of the driving velocity of the endless belt determined according to the motor working plan and to make the motor working plan for determining the alteration pattern of the driving velocity of the endless belt which has a phase difference relative to the alteration pattern of the moving velocity of the robot determined according to the robot motion plan through communication with the robot.

According to the locomotive performance testing apparatus of the sixth aspect of the present invention, the robot may be configured to control the walking motions or running motions thereof so as to allow the alteration pattern of the moving velocity of the robot whose locomotive performance is tested on the endless belt to have a phase difference relative to the alteration pattern of the driving velocity of the endless belt. Thereby, the locomotive performance of the robot can be tested by harmonizing the motion tempos of the endless belt and the robot in relation to the phase difference.

A seventh aspect of the present invention is dependent on the sixth aspect of the present invention, wherein the second processing element is configured to cause the robot controlling element to set the phase difference on the basis of the kinetic state of the robot or the robot motion plan.

According to the locomotive performance testing apparatus of the seventh aspect of the present invention, the locomotive performance of the robot may be tested by harmonizing the motion tempo of the robot with the motion tempo of the endless belt appropriately in consideration of the kinetic state of the robot or the robot motion plan.

An eighth aspect of the present invention is dependent on the first aspect of the present invention, wherein the locomotive performance testing apparatus includes a plurality of endless belts and a plurality of motors to respectively drive the plurality of endless belts to rotate, wherein the motor controlling element is configured to respectively control motions of the plurality of motors.

According to the locomotive performance testing apparatus of the eighth aspect of the present invention, the locomotive performance of the robot may be tested by harmonizing the motion tempo of each of the plurality of endless belts with the motion tempo of each of the plurality of legs of the robot. Further, the motion of each of the plurality of endless belts may be adjusted separately according to the different motion of each of the plurality of legs of the robot. Thereby, various locomotive performance, such as left or right turning, forward moving or backward moving, of the robot may be tested by maintaining the position and direction of the robot constantly on the plurality of endless belts.

According to a ninth aspect of the present invention, there is provided a locomotive performance testing apparatus for testing locomotive performance of a robot capable of moving according to repeated motions including leaving a floor and landing on the floor of a plurality of legs, comprising: an endless belt; a motor to drive the endless belt to rotate; and a motor controlling element configured to control the motions of the motor on the basis of a motor working plan for determining an alteration pattern of a driving velocity of the endless belt, wherein the motor controlling element is configured to cause a robot controlling element configured to control the motions of the robot according to a robot motion plan for determining an alteration pattern of a moving velocity of the robot to recognize the motor working plan and to make the robot motion plan on the basis of the motor working plan through communication with the robot controlling element.

According to the locomotive performance testing apparatus of the ninth aspect of the present invention, the robot motion plan is made on the basis of the motor working plan. The motions of the robot are controlled according to the robot motion plan. Thereby, the alteration pattern of the moving velocity of the robot whose locomotive performance is tested on the endless belt can be controlled in relation to the alteration pattern of the driving velocity of the endless belt. As a result, the motion tempo of the endless belt and the motion tempo of the robot can be harmonized so as to make the motion tempo of the robot come to a compromise with the motion tempo of the endless belt, allowing the locomotive performance of the robot to be performed stably.

A tenth aspect of the present invention is dependent on the ninth aspect of the present invention, wherein the locomotive performance testing apparatus includes a plurality of endless belts and a plurality of motors to respectively drive the plurality of endless belts to rotate, wherein the motor controlling element is configured to respectively control motions of the plurality of motors.

According to the locomotive performance testing apparatus of the tenth aspect of the present invention, the locomotive performance of the robot can be tested by harmonizing the motion tempo of each of the plurality of endless belts with that of each of the plurality of legs. Further, the motion of each of the plurality of endless belts may be adjusted separately according to the different motion of each of the plurality of legs of the robot. Thereby, various locomotive performance, such as left or right turning, which is different from the forward moving or backward moving, of the robot may be tested by maintaining the position and direction of the robot constantly on the plurality of endless belts.

BRIEF DESCRIPTION OF THE DRAWINGS

FIG. 5 is a diagram illustrating the function of the locomotive performance testing apparatus of the present invention

DETAILED DESCRIPTION OF THE PREFERRED EMBODIMENTS

Figure 1:
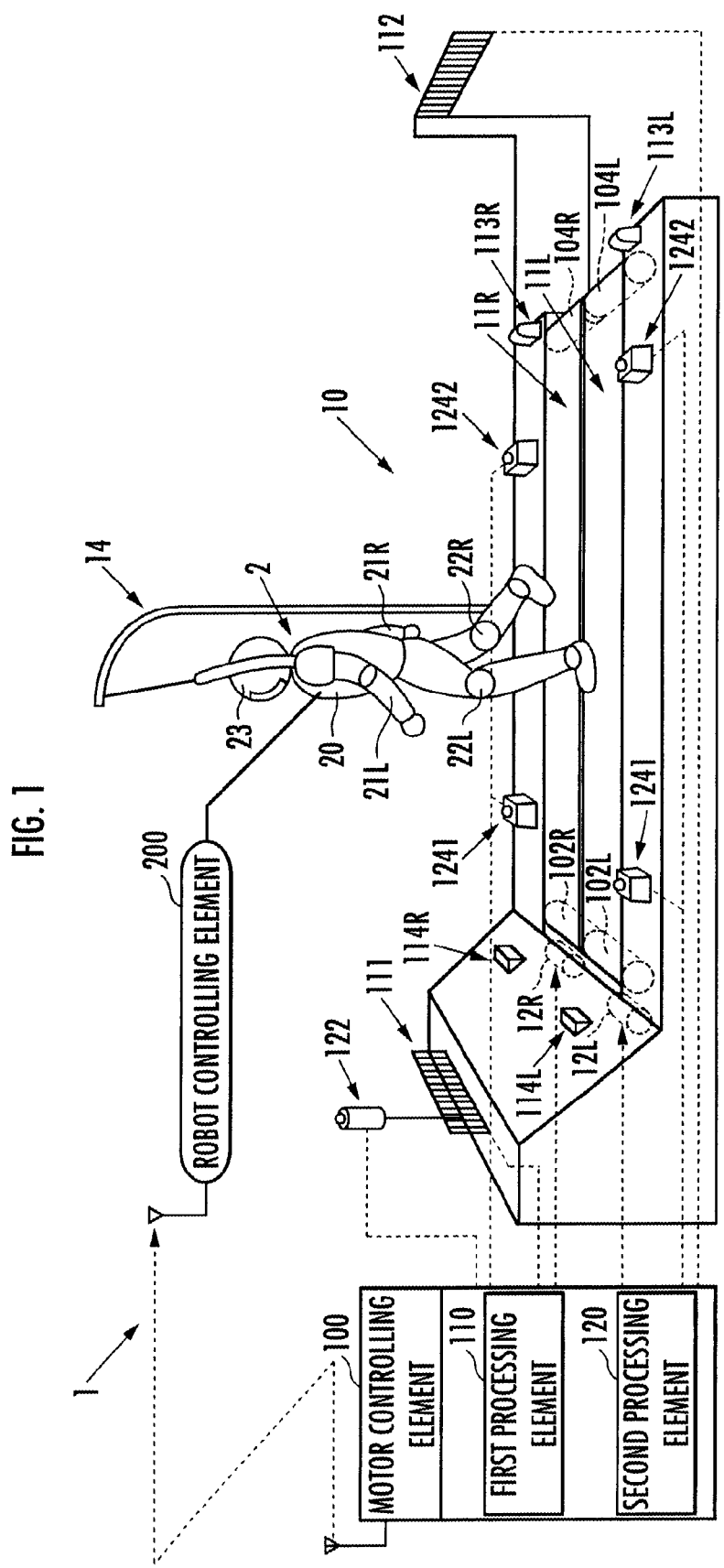
FIG. 1 is a diagram illustrating the configuration of a locomotive performance testing apparatus of the present invention.

Hereinafter, embodiments of a locomotive performance testing apparatus according to the present invention will be described with reference to the drawings.

First, the configuration of the locomotive performance testing apparatus will be explained with reference to FIG. 1 and FIG. 2. Hereinafter, numerals L and R are used to denote the left and right components, respectively. However, if the left component and the right component are common or the left and right components are mentioned as a whole, the numerals will be omitted where appropriate.

The locomotive performance testing apparatus 1 is used to test the locomotive performance of a robot 2 or the like, including a treadmill 10, a monitor which displays the locomotive performance of the robot 2 or other measuring devices 16 (refer to FIG. 2), and a motor controlling element 100.

The treadmill 10 includes a pair of endless belts 11L and 11R which are disposed in parallel, two motors 12L and 12R which drive the pair of endless belts 11L and 11R to rotate, respectively, and a lifter 14 which suspends the robot 2 to allow a free motion of the robot 2 vertically.

The endless belt 11L is wrapped across a pair of rollers 102L and 104L. The endless belt 11R is wrapped across a pair of rollers 102R and 104R. The rollers 102L and 102R are driven by the motors 12L and 12R to rotate the endless belts 11L and 11R, respectively. Each of the motors 12L and 12R is provided with an encoder (not shown) which outputs a signal according to its rotating velocity thereof.

The treadmill 10 is provided with an array of light emitting elements 111 disposed in parallel at an anterior part thereof and an array of light receiving elements (a first sensor) 112 disposed in parallel at a posterior part thereof. The array of light receiving elements 112 detects the light emitted from the array of light emitting elements 111. The working state of the first sensor 112, in other words, the light receiving state and the non-light receiving state of each of the light receiving elements which constitute the first sensor 112, alters according to the standing position of the robot 2 in the lateral direction. The left and right sides of the anterior part of the treadmill 10 are disposed with first limit sensors 114L and 114R which emit lights toward reflectors 113L and 113R disposed at the left and right sides of the posterior part of the treadmill 10 and detect the lights reflected from the reflectors 113L and 113R, respectively. The first limit sensor 114L outputs a signal on the basis of a condition whether a part of the robot 2 goes beyond the left side of an allowable area on the treadmill 10; on the other hand, the first limit sensor 114R outputs a signal if a part of the robot 2 goes beyond the right side of the allowable area on the treadmill 10.

The anterior part of the treadmill 10 is disposed with a second sensor 122 which emits laser lights to the robot 2 and on the basis of the laser lights reflected from the robot 2, outputs a signal corresponding to the standing position of the robot 2 in the anteroposterior direction. The left and right sides of the anterior part of the treadmill 10 are disposed respectively with a pair of second limit sensors 1241. The left and right sides of the posterior part of the treadmill 10 are disposed respectively with a pair of second limit sensors 1242. The second limit sensor 1241 outputs a signal on the basis of a condition whether a part of the robot 2 goes beyond the front side of the allowable area on the treadmill 10; on the other hand, the limit sensor 1242 outputs a signal if a part of the robot 2 goes beyond the back side of the allowable area on the treadmill 10.

The motor controlling element 100 is comprised of a CPU, a ROM, a RAM, an I/O and the like and is provided with a first processing element 110 and a second processing element 120. The motor controlling element 100 controls the motions of the motors 12L and 12R individually according to a motor working plan made on the basis of a robot motion plan. The motor controlling elements 100 determines a deviation between a present position or direction of the robot 2 and the desired position or direction thereof, and then control the motions of the motors 12L and 12R individually so as to offset the deviation.

The first processing element 110 recognizes the robot motion plan for determining a desired ZMP, a stable support area, an alteration pattern of a moving velocity of the robot 2 and the like through communication with a robot controlling element 200 for controlling the robot 2. The desired ZMP can be determined on the basis of a position of the center of gravity, a vertical component of a force acting on the center of gravity (may be obtained according to the mass of the robot 2, for example) and a horizontal component of the force (may be obtained according to the acceleration of the robot 2 in the horizontal direction) of the robot 2. The stable support area is defined as an enclosed area which is contacted or stepped on by the leg 22L or 22R of the robot 2 and has no recessed portion in shape (refer to the support polygons in FIG. 45, JP 03-057427A1 and in FIG. 39, JP 03-061917A1).

The second processing element 120 makes the motor working plan for controlling the driving of the endless belts 11L and 11R, respectively, on the basis of the robot motion plan recognized by the first processing element 110. Specifically, the motor working plan is made to control the driving of the endless belts 11L and 11R, respectively, so as to enclose the desired ZMP of the robot 2 in the stable support area. Moreover, the motor working plan is made to control the driving of the endless belts 11L and 11R, respectively, so as to allow a phase difference $d\theta$ between an alteration pattern of a driving velocity of the endless belts 11L, 11R and an alteration pattern of a moving velocity of the robot 2 to approximate a desired phase difference $d\theta_0$.

The robot 2 includes a body (a trunk) 20, a pair of arms 21 extended from both sides of an upper section of the body 20, a pair of left and right legs 22 extended from a lower section of the body 20, a head 23 disposed upper of the body 20, and the robot controlling element 200 configured to control the motions of the legs 22 and the like according to the robot motion plan. The robot 2 can walk or run by making the pair of left and right legs 22 leave and land on a floor, respectively.

Subsequently, a testing method of the locomotive performance of the robot 2 by the locomotive performance testing apparatus 1 having the aforementioned configuration will be described with reference to FIGS. 3 to 5.

First, the robot 2 is transported while suspended by the lifter 14 and is located at an initial position in such a way that the left leg 22L and the right leg 22R stand on the motionless endless belts 11L and 11R, respectively. The initiation of walking or running of the robot 2 actuates the motors 12L and 12R, respectively, and the endless belts 11L and 11R are driven to rotate at the same velocity. The initiation of the motions of the robot 2 may be detected by, for example, by the motor controlling element 100 on the basis of communication with the robot controlling element 200 of the robot 2. It may also be detected the motor controlling element 100 on the basis of the output of the second sensor 122.

Figure 2:
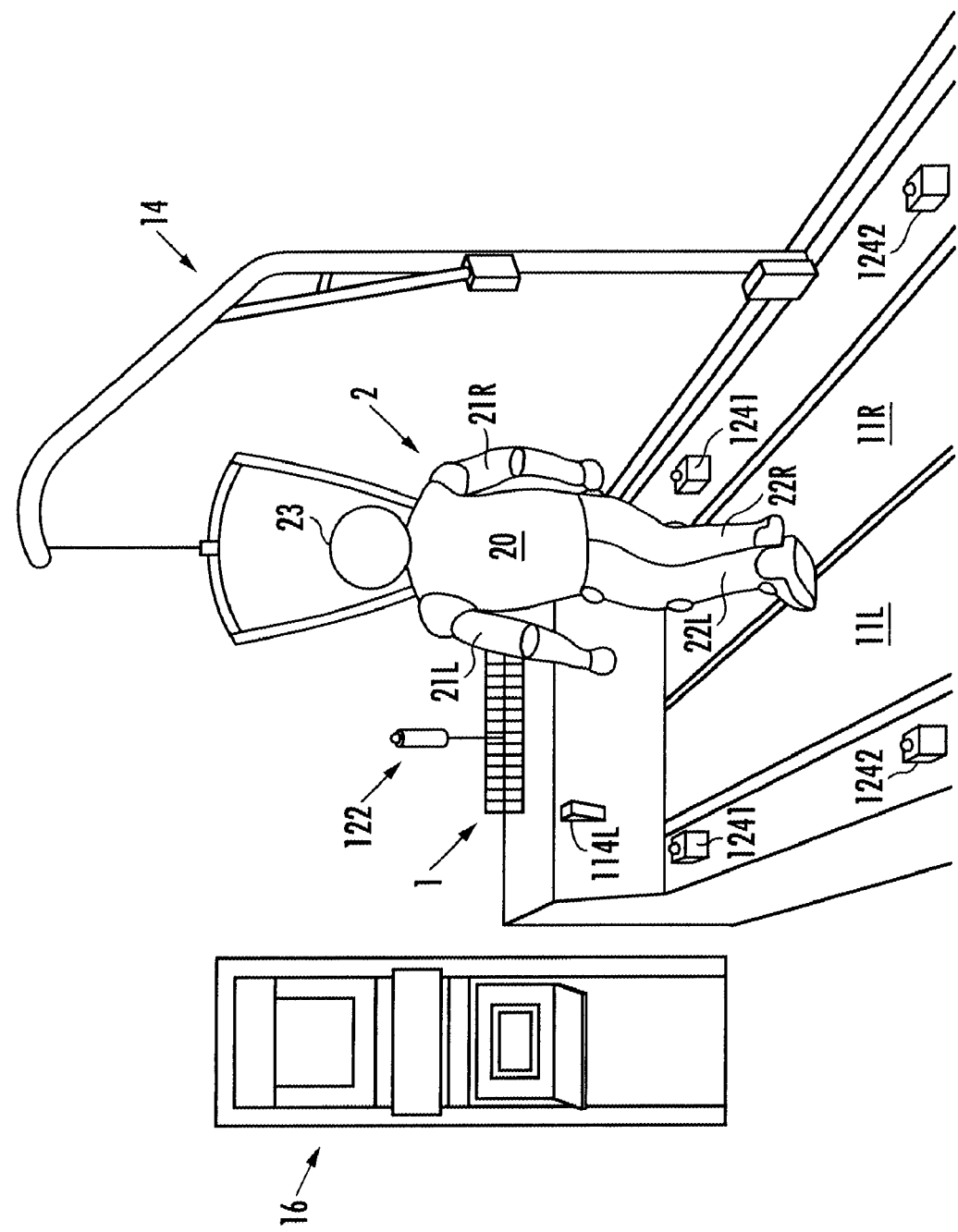
FIG. 2 is a diagram illustrating the configuration of the locomotive performance testing apparatus of the present invention.

As illustrated in FIG. 1 and FIG. 2, the locomotive performance of the robot 2 is tested while being lifted by the lifter 14 via belts attached to the left and right shoulders. Note that the locomotive performance of the robot 2 may be also tested while being freed from the lifter 14.

Figure 3:
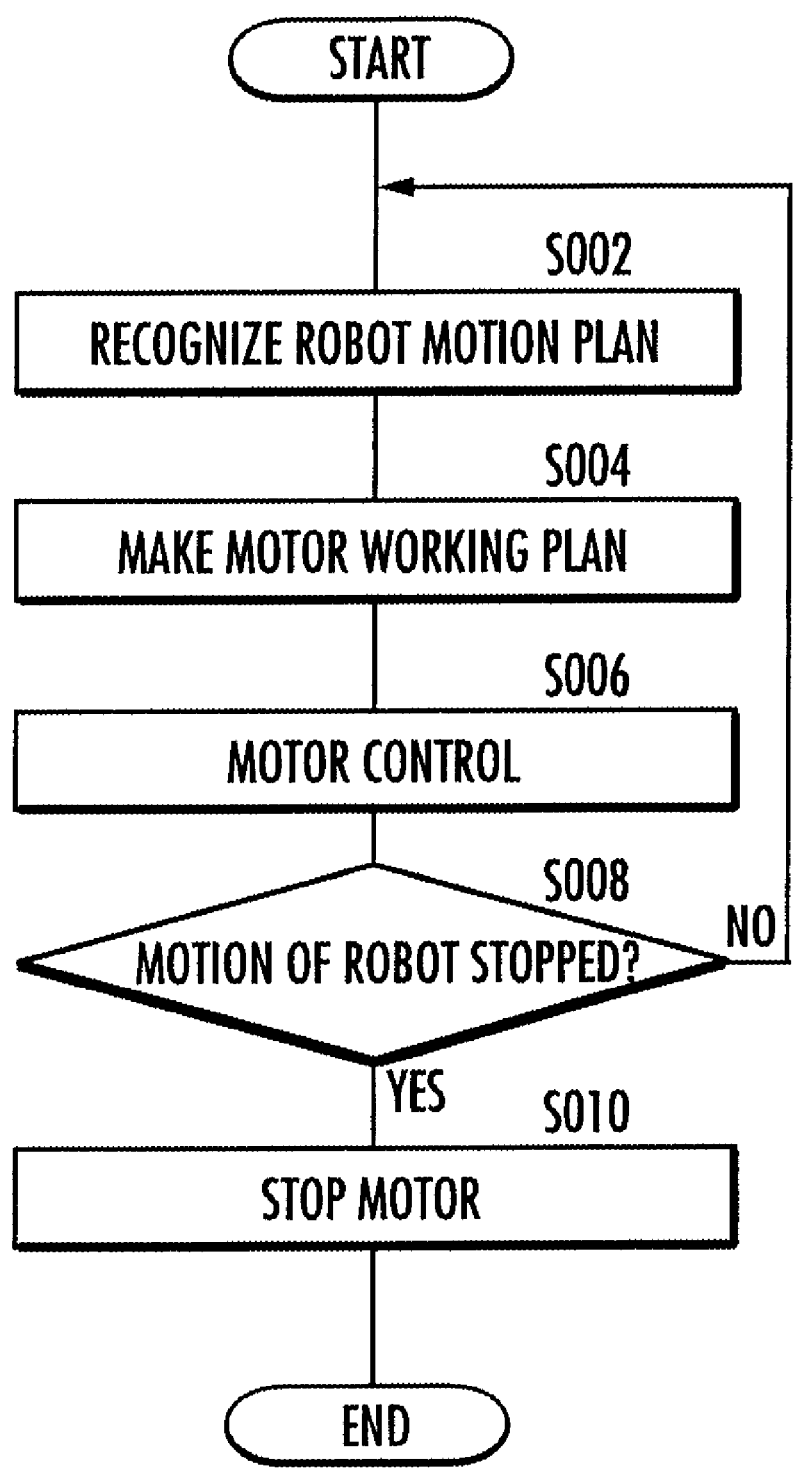
FIG. 3 is a diagram illustrating the function of the locomotive performance testing apparatus of the present invention.

Before the robot 2 is activated to move or immediately after the motion of the robot 2, the first processing element 110 recognizes or receives sequentially the robot motion plan stored in a memory of the robot controlling element 200 through communication with the robot controlling element 200 (FIG. 3/S002).

Figure 4:
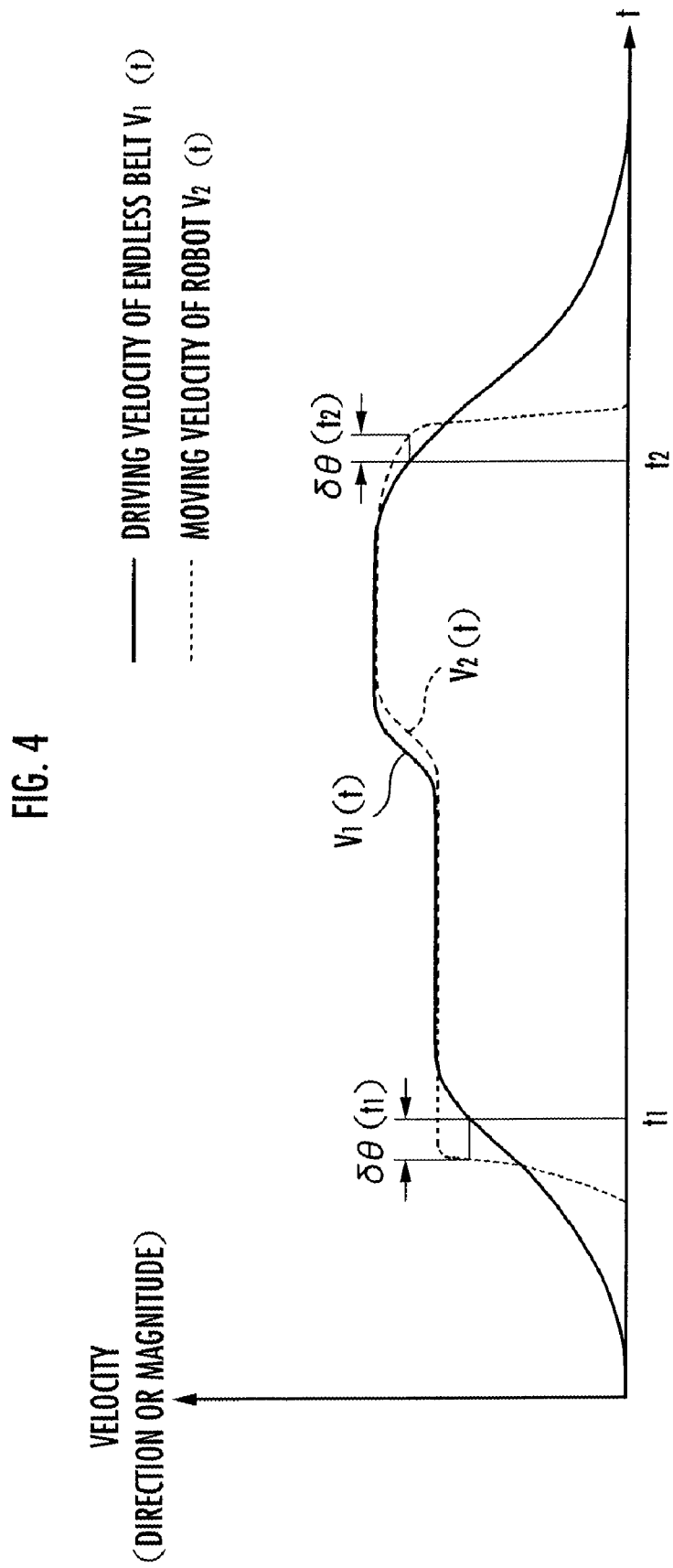
FIG. 4 is a diagram illustrating the function of the locomotive performance testing apparatus of the present invention

For example as illustrated in FIG. 4 by a dashed line, the alteration pattern of the moving velocity $v_2$ of the robot 2 which changes in an order of the start of walking, velocity maintaining, accelerating, velocity maintaining and the stop of walking may be specified according to the robot motion plan.

Furthermore, the desired ZMP and the stable support area which are varying with time in relation to the behavior of the robot 2 are recognized according to the robot motion plan. As illustrated in FIG. 5, the desired ZMP is obtained as an intersection point between an action line of a force f acting on the center of gravity of robot 2 and the floor (the endless belts 11L, 11R). A vertical component $f_z$ of the force f may be expressed by, for example, the mass M of the robot 2 and the acceleration of gravity g of the robot 2 as $f_z$=Mg and a horizontal component $f_x$ may be expressed by the mass M and a horizontal component a of the acceleration of the robot 2 as $f_x$=Ma. The stable support area is obtained as an enclosed area which is contacted by the leg 22L or 22R of the robot 2 and has no recessed portion in shape. For example, as illustrated in FIG. 5, when the robot 2 lands the lower portion (foot) of the left leg 22L on the floor, an area contacted by the sole of the left leg 22L is recognized as a stable support area.

Thereafter, the second processing element 120 makes the motor working plan according to the robot motion plan (FIG. 3/S004). Based on the robot motion plan, the alteration pattern of the driving velocity $v_1$ of each of the endless belts 11L and 11R is specified in an order of accelerating, maintaining velocity, re-accelerating, maintaining velocity, decelerating and stopping, as illustrated in FIG. 4 by a solid line. The robot 2 may be positioned at the desired position according to the alteration pattern of the driving velocity $v_1$ of the endless belt 11. The driving velocity $v_1$ of the endless belt 11 has the phase difference δθ with respect to the alteration pattern of the moving velocity $v_2$ of the robot 2. As illustrated in FIG. 4, the phase difference δθ represents a factor showing a temporal deviation between the alteration pattern of the moving velocity $v_2$ of the robot 2 and the alteration pattern of the driving velocity $v_1$ of the endless belt 11. The phase difference δθ may be set as a fixed factor; it may also be set as a variable one. As examples of the kinetic state of the robot 2, the accelerated moving state, the decelerated moving state and the like may be mentioned. When the robot 2 is walking or running steadily, the kinetic state of the robot 2 is recognized on the basis of the standing position of the robot in the anteroposterior direction determined by the second sensor 122 and the driving velocity $v_1$ of the endless belt 11. In addition, even during a short period around the start of walking or the stop of walking of the robot 2, the kinetic state of the robot 2 can also be recognized on the basis of the standing position of the robot in the anteroposterior direction determined by the second sensor 122 and the driving velocity $v_1$ of the endless belt 111. It is also possible to recognize the kinetic state of the robot 2 on the basis of an analysis performed by the second processing element 120 on an image taken by a photographing device (not shown) such as a CCD camera during a short period around the state of walking or the stop of walking of the robot 2.

The driving velocity $v_{1L}$ of the left endless belt 11L and the driving velocity $v_{1R}$ of the right endless belt 11R at each time are set so as to enclose the desired ZMP of the robot 2 in the stable support area. For example, when the left leg 22L (landing on the floor) is in a state as illustrated in FIG. 5 by a solid line, the desired ZMP of the robot 2 will deviate from the area corresponding to the sole of the left leg 22L (the stable support area). In this situation, the alteration pattern of the driving velocities $v_{1L}$ of the left endless belt 11L and $v_{1R}$ of the right endless belt 11R are set so that the desired ZMP of the robot 2 will not be dislocated out of the stable support area. In other words, the alteration pattern of the driving velocity $v_1$ of the endless belt is set so that the desired ZMP of the robot 2 is enclosed in the area corresponding to the sole of the left leg 22L, i.e., the left leg 22L becomes a state illustrated in FIG. 5 by a dashed line. It is also possible to set the driving velocity $v_{1L}$ of the left belt 11L and the driving velocity $v_{1R}$ of the right belt 11R, respectively, so as to enclose the desired ZMP in an area defined in the stable support area according to the viewpoint of maintaining stably the posture of the robot 2. If the robot 2 has a self-adjust function to apply an acceleration on the center of gravity by the motions of the body 20, it is also possible to set the driving velocity $v_{1L}$ of the left belt 11L and the driving velocity $v_{1R}$ of the right belt 11R, respectively, on the basis of the self-adjust function so as to enclose the desired ZMP in an area extended beyond the stable support area.

Subsequently, the motor controlling element 100 controls the working of the motors 12L and 12R, respectively, according to the motor working plan made by the second processing element 120 (FIG. 3/S006). As a result, the driving velocity $v_1$ of each of the endless belts 11L and 11R is controlled by the same motor working plan. The robot 2 walks or runs on the driving endless belt 11 according to the robot motion plan, and the locomotive performance thereof is tested on such a situation.

As illustrated in FIG. 1 and FIG. 2, the robot 2 may lifted by the lifter 14 via belts attached to the left and right shoulders and the locomotive performance thereof is tested on such a situation. If the load applied to the lifter 14 or a change of the load determined by the motor controlling element 100 surpasses an allowable range, the robot 2 may be lifted up by the lifter 14 to prevent the locomotive performance test from being continued, since in this situation it is highly possible that the robot 2 has lost its balance. In addition, the locomotive performance of the robot 2 may be also tested while being freed from the lifter 14.

If either one of the first limit sensors 114L and 114R detects that some parts of the robot 2, especially the legs 22L and 22R thereof, have gone laterally beyond an allowable range on the treadmill 10, the test may be terminated forcibly by, for example, lifting up the robot 2 through the lifter 14, or gradually decelerating the motors 12L and 12R to a stop. Moreover, if either one of the second sensor 122 and the second limit sensors 1241 and 1242 detects that some parts of the robot 2, especially the legs 22L and 22R thereof, have gone anteroposteriorly beyond the allowable range on the treadmill 10, the test may be terminated forcibly by, for example, lifting up the robot 2 through the lifter 14, or gradually decelerating the motors 12L and 12R to a stop.

Thereafter, whether the motion of the robot 2 has been stopped is determined (FIG. 3/S008). If it is determined that the robot 2 is still in motion (FIG. 3/S008 . . . NO), the aforementioned processes, such as the recognition of the robot motion plan and the like, are repeated (FIG. 3/S002-S008). On the contrary, if the motion of the robot 2 is determined to have been stopped (FIG. 3/S008 . . . YES), the motors 12L and 12R are gradually stopped by the motor controlling element 100 (FIG. 3/S010).

According to the locomotive performance testing apparatus 1 of the present invention which exhibits the aforementioned functions, the motor working plan is made according to the robot motion plan and the motors are driven to work according to the motor working plan (refer to FIG. 3/S002, S004 and S006). Accordingly, the alteration pattern of the driving velocity $v_1$ of the endless belt 11 may be controlled in relation to the alteration pattern of the moving velocity $v_2$ of the robot 2 whose locomotive performance is being tested on the endless belt 11.

Moreover, the motor working plan for determining the alteration pattern of the driving velocity $v_1$ of the endless belt 11 is so made that the alteration pattern of the driving velocity $v_1$ of the endless belt 11 has the phase difference $d\theta$ with respect to the alteration pattern of the moving velocity $v_2$ of the robot 2. Therefore, the alteration pattern of the driving velocities $v_{1L}$ of the endless belt 11L and $v_{1R}$ of the endless belt 11R may be controlled to have the phase difference $d\theta$ with respect to the alteration pattern of the moving velocity of the robot 2 which is being tested on the endless belts 11L and 11R.

According to the aforementioned processing, the motion tempo of the endless belt 11 and the motion tempo of the robot 2 can be harmonized so as to make the motion tempo of the endless belt come to a compromise with the motion tempo of the robot while maintaining the phase difference, allowing the locomotive performance of the robot to be performed stably.

Further, the driving velocity $v_{1L}$ of the endless belt 11L and the driving velocity $v_{1R}$ of the endless belt 11R are controlled so as to enclose the desired ZMP of the robot 2 in the stable support area. Thereby, the locomotive performance test for the robot 2 can be performed by preventing the posture thereof from becoming unstable due to the reason that the desired ZMP of the robot 2 deviates from the stable support area, for example, when the left leg 22L of the robot 2 is contacting the floor but the left endless belt 11L is driven at an unnecessarily fast velocity, the posture of the left leg 22L will be like that illustrated in FIG. 5 by a solid line, causing the desired ZMP to deviate from the sole area of the left leg. As illustrated in FIG. 5, the moment M around the center of gravity, which plunges the robot 2 forward, is applied to the robot 2, and consequently, it will cause the posture of the robot 2 to become unstable. According to the present invention, such problems can be avoided, allowing the locomotive performance test of the robot 2 to be performed.

By controlling the endless belts 11L and 11R to rotate at different velocities $v_{1L}$ and $v_{1R}$, the left-turning performance and the right-turning performance of the robot 2 may be tested while maintaining the position and direction of the robot 2 at constant. The difference between the driving velocity $v_{1L}$ of the left endless belt 11L and the driving velocity $v_{1R}$ of the right endless belt 11R may be defined according to the lower limit of a turning radius of the robot 2.

In the above embodiment, the locomotive performance is tested on the robot 2 having two legs of 22L and 22R. In other embodiments, the walking or running performance test may be performed on a robot having three or more than three legs, or on a device movable on a plurality of tires.

It is possible that the second processing element 120 causes the robot controlling element 200 to recognize the motor working plan through communication with the robot controlling element 200 and to make the robot motion plan according to the motor working plan so as to enclose the desired ZMP of the robot 2 in the stable support area. As a result, the locomotive performance test of the robot 2 can be performed by preventing the posture of the robot 2 from becoming unstable due to the deviation of the desired ZMP thereof from the stable support area because of the driving velocity alteration of the endless belts 11L, 11R and the like.

Moreover, it is possible that the second processing element 120 causes the robot controlling element 200 to recognize the alteration pattern of the driving velocity of the endless belts 11L and 11R defined according to the motor working plan through the communication and to make the robot motion plan for determining the alteration pattern of the moving velocity of the robot 2 which has a phase difference with respect to the alteration pattern of the driving velocity. According thereto, the locomotive performance of the robot 2 may be tested by harmonizing the motion tempo of the endless belts 11L and 11R with the motion tempo of the robot 2 in relation to the phase difference.

In addition, the phase difference may be set by the robot 2 on the basis of the kinetic state thereof or the robot motion plan. As a result, the locomotive performance of the robot 2 may be tested by harmonizing the motion tempo of the robot 2 with the motion tempo of the endless belts 11L and 11R in consideration of the kinetic state of the robot 2 or the robot motion plan.

In the above embodiment, the locomotive performance of the robot 2 is tested by using the treadmill 10 having two endless belts 11L and 11R which are driven to rotate independently. As another embodiment, it is possible to use a treadmill having a single endless belt to test forward or backward locomotive performance of the robot 2.

In the above-mentioned embodiment, the standing position of the robot 2 is determined by the first sensor 112 constituted by the light-receiving elements and the second sensor 122 emitting laser lights. As another embodiment, the standing position of the robot 2 may be determined by a wide-range distance laser sensor of a scanning type.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

What is claimed is:

1. A locomotive performance testing apparatus for testing locomotive performance of a robot capable of moving according to repeated motions of a plurality of legs by leaving a floor and landing on the floor, comprising:
   an endless belt;
   a motor to drive the endless belt to rotate; and
   a motor controlling element configured to control motions of the motor based on a motor working plan for determining an alteration pattern of a driving velocity of the endless belt,
   wherein the motor controlling element includes
   a first processing element configured to recognize a robot motion plan for determining at least an alteration pattern of a moving velocity of the robot through communication with a robot controlling element configured to control motions of the robot based on the robot motion plan; and a second processing element configured to make the motor working plan based on the robot motion plan recognized by the first processing element.

2. The locomotive performance testing apparatus according to claim 1, further comprising:
- a plurality of sensors for detecting a condition to stop locomotive performance testing; and
- a lifter attached to the robot during locomotive performance testing,
- wherein the lifter is adapted to lift the robot to discontinue locomotive testing when the plurality of sensors detect the condition to stop locomotive performance testing.

3. The locomotive performance testing apparatus according to claim 2, wherein
- the plurality of sensors detect a load applied to the lifter by the robot,
- the condition to stop locomotive performance testing is a loss of balance of the robot, and
- the plurality of sensors detect the loss of balance of the robot when the load applied to the lifter by the robot exceeds a predetermined load.

4. The locomotive performance testing apparatus according to claim 2, wherein
- the plurality of sensors detect a lateral and anteroposterior position of the robot on the endless belt,
- the condition to stop locomotive performance testing is met when the robot is outside of one of a predetermined lateral range on the endless belt and a predetermined anteroposterior range on the endless belt, and
- the plurality of sensors detect the robot being outside of one of the predetermined lateral range on the endless belt and the predetermined anteroposterior range on the endless belt when a portion of the robot is outside of one of the predetermined lateral range on the endless belt and the predetermined anteroposterior range on the endless belt.

5. The locomotive performance testing apparatus according to claim 4, wherein the portion of the robot is at least one of the plurality of legs.

6. The locomotive performance testing apparatus according to claim 1, wherein the second processing element makes the motor working plan for determining the driving velocity of the endless belt based on a desired ZMP and a stable support area determined according to the robot motion plan so as to enclose the desired ZMP in the stable support area.

7. The locomotive performance testing apparatus according to claim 1, wherein the second processing element makes the motor working plan for determining the alteration pattern of the driving velocity of the endless belt which has a phase difference relative to the alteration pattern of the moving velocity of the robot determined according to the robot motion plan.

8. The locomotive performance testing apparatus according to claim 7, wherein the second processing element sets the phase difference based on at least one of a kinetic state of the robot and the robot motion plan recognized by the first processing element.

9. The locomotive performance testing apparatus according to claim 1, wherein the second processing element is configured to cause the robot controlling element to recognize the motor working plan and make the robot motion plan based on the motor working plan so as to enclose a desired ZMP of the robot in a stable support area through communication with the robot controlling element.

10. The locomotive performance testing apparatus according to claim 9, wherein the second processing element is configured to cause the robot controlling element to recognize the alteration pattern of the driving velocity of the endless belt determined according to the motor working plan and make the motor working plan for determining the alteration pattern of the driving velocity of the endless belt which has a phase difference relative to the alteration pattern of the moving velocity of the robot determined according to the robot motion plan through communication with the robot.

11. The locomotive performance testing apparatus according to claim 10, wherein the second processing element is configured to cause the robot controlling element to set the phase difference based on at least one of the kinetic state of the robot and the robot motion plan.

12. The locomotive performance testing apparatus according to claim 1, including a plurality of endless belts and a plurality of motors to drive the plurality of endless belts to rotate, respectively, wherein the motor controlling element is configured to control motions of the plurality of motors, respectively.

13. A locomotive performance testing apparatus for testing locomotive performance of a robot capable of moving according to repeated motions of a plurality of legs by leaving a floor and landing on the floor, comprising:
- an endless belt;
- a motor to drive the endless belt to rotate; and
- a motor controlling element configured to control motions of the motor based on a motor working plan for determining an alteration pattern of a driving velocity of the endless belt,
- wherein the motor controlling element is configured to cause a robot controlling element, which is configured to control the motions of the robot according to a robot motion plan for determining an alteration pattern of a moving velocity of the robot, to recognize the motor working plan and to make the robot motion plan based on the motor working plan through communication with the robot controlling element.

14. The locomotive performance testing apparatus according to claim 13, including a plurality of endless belts and a plurality of motors to drive the plurality of endless belts to rotate, respectively, wherein the motor controlling element is configured to control motions of the plurality of motors, respectively.

* * * * *